Patented Mar. 22, 1949

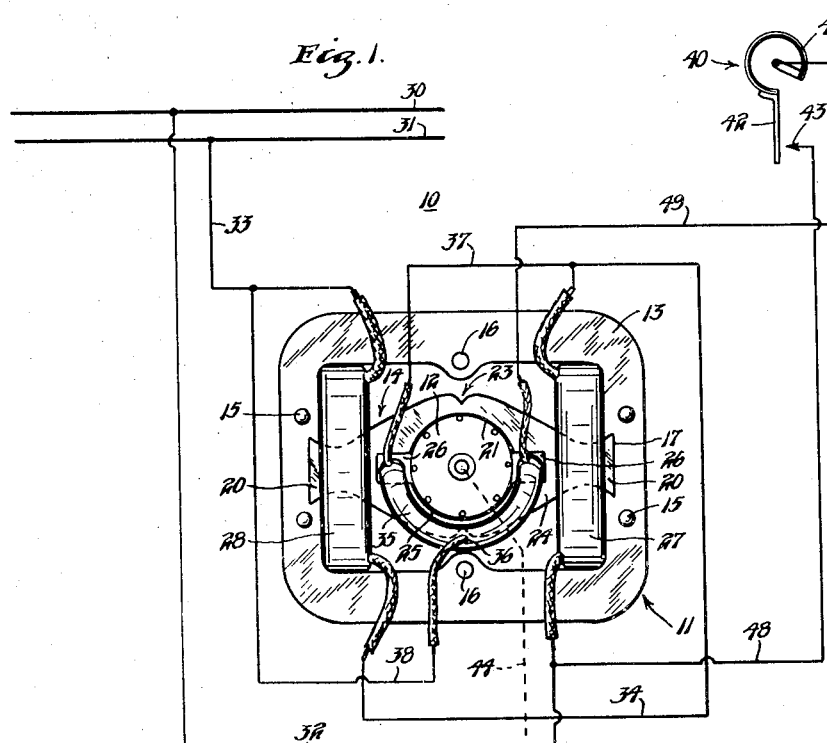
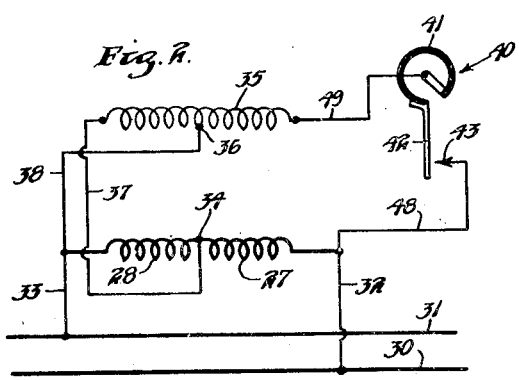

2,465,325

UNITED STATES PATENT OFFICE 2,465,325

REVERSIBLE INDUCTION MOTOR

Carl G. Kronmiller, Minneapolis, Minn., assignor to Minneapolis-Honeywell Regulator Company, Minneapolis, Minn., a corporation of Delaware Application July 17, 1947, Serial No. 761,618

9 Claims. (Cl. 318—225)

The present invention relates to small fractional horsepower induction motors and more particularly to the type which is reversible.

Induction motors of the single phase type employing energized auxiliary or cross field windings to provide a flux which is shifted in phase from the main energizing flux are old in this art, but such motors require a reversal of current flow through said auxiliary winding in order to accomplish reversal in the direction of rotation of the motor. This reversal of current flow in the auxiliary winding necessitates the use of a control device employing two circuits and a double pole double throw control device or its equivalent. Such a motor, however, could not be operated where a system permits and employs only a single make or pole control device. It is therefore an object of this invention to provide such a reversible type induction motor employing an energized auxiliary or cross field winding which can be operated by a single pole single throw control device or its equivalent.

It is also an object of this invention to provide a reversible motor in which the necessary external connections which must be made to it are held to a minimum.

Another object of this invention is to provide an inexpensive, simple motor of this type.

Other objects of this invention will become apparent from a consideration of the accompanying specification, claims, and drawing of which:

Figure 1 is a schematic showing of the invention, and

Figure 2 is a circuit arrangement of this motor.

Referring to the drawing, it is seen that motor 10 comprises a field member or stator 11 and a rotating member or rotor 12. Stator 11 is of the core type which includes a rectangular shaped frame or core section 13 and a pole piece section 14. The core section 13 and the pole piece section 14 are formed of a laminated magnetic material in the customary manner and are held together by rivets 15 (not shown for the pole piece section). The laminations of the core section in addition to the rivet holes include apertures 16 and a pair of wedge shaped recesses 17. The apertures 16 when the laminations are stacked form a hole or opening through which the bearing plates for the motor (not shown) are attached to the frame 13. The wedge shaped recesses 17 provide a means of securing the pole piece section 14 to the frame or core 13 in a dovetailed connection. The laminations of the pole piece portion 14 are similarly stamped to include a pair of dovetailed wedges 20 which fit into the recesses 17. The pole piece laminations also include a centrally located aperture 21, a pair of rectangularly shaped notches 26 abutting this centrally located aperture and a pair of V-shaped notches 23 positioned midway along the extent of the pole piece laminations which do not border on the centrally located aperture 21. When the pole piece laminations are stacked, this centrally located aperture provides the opening 21 in which the rotor 12 is positioned and also defines the pole pieces 24 and the pole faces 25 of said pole piece portion. The V-shaped notches similarly provide a pair of notches 23 extending across the depth of the stacked laminations to further define the pole pieces 24 and also reduce the amount of magnetic material remaining in the pole section 14 between the pole pieces 24. This remaining material forms a magnetic bridge between the pole pieces 24 to effect, in a well known manner, a better distribution of flux between said pole pieces. The pair of rectangular shaped notches 26, when the laminations of the pole piece section 14 are stacked, form the slots 26 extending the width of the pole faces 25 which are parallel to the axis of rotation of the rotor 12. The magnetic circuit produced by the pole piece section 14 and the core or frame 13 is completed through the rotor 12, which here is of the squirrel cage type. This circuit extends from one pole piece 24 through the rotor 12 to the opposite pole piece, through both sides of the core 13 and back to the pole piece section 14.

The main field energizing windings 27, 28 are positioned on the pole pieces 24 nearest the rectangular core 13 and are connected in series connection across a pair of line wires 30, 31 which are energized by some source of single phase power (not shown). The resistance of these windings or coils is low in comparison with its reactance to give a definite phase relationship between the energizing voltage and the current flowing in the wire. The flux in these windings is additive since the coils 27, 28 are so connected and provide the main energizing flux for this motor. This flux flows in the magnetic circuit described above in the direction which depends upon the instantaneous polarity of the energizing source. The electrical circuit energizing these coils is as follows: line wire 30, conductor 32, coil or winding 27, conductor 34, coil 28, and conductor 33 to line wire 31.

Auxiliary or cross field winding 35 is positioned between the pole faces 25 with a portion of said winding being positioned in each of the slots 26 of the pole pieces 24 and with the unmounted portions thereof encircling the under side of the axis of rotor 12. The resistance of this winding is high compared to its reactance so that the flux produced thereby through the rotor 12 is approximately 90° displaced in phase from that flux produced by the main field windings or coils 27, 28 and, as a result, the two fluxes produce the necessary rotating flux field to start and operate the motor 10 from a single phase source of power. Auxiliary winding 35 has a tapped connection 36 at some point along its extremity which effectively divides said winding into two sections for purposes which will become evident as the disclosure proceeds.

One extremity of the auxiliary winding 35 is permanently connected by conductor 37 to the midpoint of the main field windings 27, 28, that is to the common conductor 34 between the coils or windings 27, 28. The tapped connection 36 of the said auxiliary winding is permanently connected by conductor 38 to one extremity of the main field winding 28, and by conductor 33 to line wire 31. The opposite extremity of the auxiliary winding is connected in series with a control switch 40 by conductors 48, 49 to the other line wire 30 of said source of power. The control switch 40 is shown in the form of a room thermostat comprising a bimetallic element 41 to which is secured a contact arm 42 adapted to engage a fixed contact 43. Upon temperature fall, the bimetallic element 41 moves the contact arm 42 to the right into engagement with the stationary contact 43. Thus one section of the auxiliary winding 35 is permanently connected in series with coil 27 of the main field windings across the source of power and the remaining section of said auxiliary winding is selectively connected in parallel with the main field windings 27, 28 across the source of power. Although the main field windings and the auxiliary winding are energized, as shown here, directly from the source of power, a suitable transformer can be used to reduce the voltage applied to these windings or across the thermostat contacts if such is desired. The present arrangement, however, does reduce the number of external connections to the motor and provides for simplicity in installation.

While the control switch 40 has been shown as a room thermostat, and while the invention is particularly adapted for connection with a sensing control switch, such as a room thermostat, it is to be understood that the invention is not so limited.

The shaft 44 of rotor 12 is connected with a suitable gear train 45, shown schematically in Figure 1, whose output shaft 46 actuates an operating or output arm 47 of the motor. The load of this motor, such as a damper of a furnace (not shown), is operated through suitable linkages from this output arm. A spring 50 is attached to arm 47 to insure return of the damper or output arm to a closed position when the motor is deenergized upon power failure, and also to assist the motor when it is moving the output arm to a closed position. A pair of stops 51 which are schematically shown in Figure 1 limit the rotation of the motor output arm 47 and therefore, the operation of the motor 10. Such stops can be incorporated in the motor assembly or within the system to which the motor is attached.

In operation, main field windings 27, 28 are continuously excited across line wires 30, 31 through the circuit described above. Stator 11 provides two parallel flux paths for the flux emanating from these windings, which paths have in common the pole piece portion 14 and the rotor 12. Any suitable disconnects (not shown) can be used to disconnect these windings from the line. The auxiliary winding 35 provides a flux to the magnetic circuit substantially in quadrature with that of the main energizing flux of the main field windings to provide a rotating flux field for said rotor. The direction of the predominant current flow through this auxiliary winding 35 will determine whether this auxiliary flux will lead or lag the main energizing flux and therefore will govern the direction of rotation of the rotor 12. While the present structure shown here employs two main field windings connected in series, the inventive teaching here will apply to motors with different types of stators where only one main field winding is used. Under such a condition, the main field winding should be tapped and a section of the auxiliary winding will be connected at such tap to be in series with a portion of the main field winding.

It will be seen that whenever the control switch 40 is in an open position, that is whenever the thermostat is satisfied, only one section of the auxiliary winding 35 is energized. This section is permanently energized with the main field windings 27, 28 regardless of the position of the control switch 40 in a circuit as follows: line wire 30, conductor 32, main field winding 27, conductor 34, conductor 37, the left hand section of the auxiliary winding 35 to the tap connection 36, conductor 38, and conductor 33 to line wire 31. The flux field thus created by the main field windings 27, 28 and this section of the auxiliary winding 35 will provide a rotating flux field to cause rotation of the rotor 12 in a given direction. This direction is such that the motor will be aided by the action of spring 50 attached to the output arm 47 of the motor 10. In the present case, if a damper should be attached to the output arm 47, this direction of rotation of the rotor would tend to move the damper to its closed position.

Whenever the temperature to which the bimetallic element 41 is subjected drops sufficiently to cause contact blade or arm 42 to engage contact 43, the following circuit is established for the remaining section of the auxiliary winding 35: line wire 31, conductor 33, conductor 38, the right hand section of the auxiliary winding 35 from tap 36 to conductor 49, contact arm 42, fixed contact 43, conductor 48 and conductor 32, to line wire 30. This circuit provides for the energization of this section of the auxiliary winding in parallel with the main field windings 27, 28 and will cause flux of an opposite polarity from that section permanently connected in series from the one coil 27 of the main field windings since the current flow in this section is in the opposite direction to the permanently connected section of auxiliary winding 35. There will be a greater current flow through this section of the auxiliary winding and hence a greater amount of flux of an opposite polarity from that of the first or permanently connected section of auxiliary winding since the circuit through the left hand portion of the auxiliary winding includes main winding 27 while that just traced through the right hand section of the auxiliary winding does not include any such impedance. A portion of this flux will cancel out and nullify the effect of flux from the first section or that section of the auxiliary winding permanently connected with the section or coil of the main field windings and the remaining flux will create a field displaced in phase from the main field flux to give a rotating flux field in the opposite direction and hence a reversal in the direction of rotation of motor 10. Such an arrangement eliminates the necessity of multiple auxiliary windings or additional control switches to accomplish this reversal of the motor.

Thus when thermostat 40 responds to a drop in temperature or a call for heat and its contacts 42, 43 close, the circuit is made selectively connecting the right hand portion of the auxiliary winding 35, as described above, and energizing motor 10 for rotation to move output arm 47 in a clockwise direction against the action of spring 50. As long as these control contacts 42, 43 of the thermostat 40 remain closed, the motor will continue to rotate until the output arm 47 or the damper, not shown, reaches the limit position 51 of full open. Should thermostat 40 still remain unsatisfied, motor 10 will stall in this limiting position with torque still applied to the output shaft 46 in this direction. As soon as thermostat 10 is satisfied, or at a time when the temperature surrounding the bimetallic arm 41 is raised sufficiently, contact arm 42 will reverse its direction of movement and contacts 42, 43 of the thermostat will open. This breaks the circuit to the right hand portion of the auxiliary winding 35 leaving the left hand portion of the auxiliary winding and the main field windings 27, 28 energized through circuits described above. Rotor 12 will then reverse its direction of rotation or applied torque and move output shaft 46, arm 47, and damper, not shown, in a counter-clockwise direction assisted by the action of spring 50. Motor 10 has sufficient torque in this direction exclusive of the action of spring 50 to move the output shaft 46 and its load counterclockwise over the full range of travel. Spring 50 is included as a fail safe feature which operates in a well known manner to return the motor load or damper arm 47 to a predetermined or closed position in the event of power failure. While the contacts 42, 43 of the thermostat 40 remain open due to the raised temperature of the bimetallic arm 41, the motor 10 will remain energized for counterclockwise rotation of the output shaft 46, as described above, and will rotate the output arm 47 and damper, not shown, until the limit position or stop 51 is reached. At this point rotation of the rotor 12, output shaft 46 and load will cease but torque will continue to be applied to the rotor as long as the thermostat contacts 42, 43 remain open and the motor is energized. A drop in the temperature will again cause thermostat 40 to operate to its closed position and the operation described above will again occur.

In considering this invention, it should be kept in mind that the present disclosure is intended to be illustrative only and that the scope of the invention is to be determined only by the amended claims.

I claim as my invention:

1. An alternating current motor comprising relatively rotatable primary and secondary members, said primary member having a primary winding thereon and a magnetic circuit embracing said secondary member, a tapped auxiliary winding including two portions for producing flux through said secondary member in quadrature to the flux produced by said primary member, means permanently connecting one portion of said auxiliary winding to at least a portion of said primary winding to cause operation of said motor in one direction, and means for selectively connecting the other portion of said auxiliary winding to said primary winding to cause a current flow through said auxiliary winding opposite in phase to and greater in magnitude than that occurring as a result of said permanent connection so that said motor operates in the opposite direction.

2. A reversible alternating current motor comprising in combination, a rotor, a stator including a core portion and a plurality of polar extensions, said polar extensions being positioned diametrically opposed on said core portion to provide an opening in which said rotor is placed, main field energizing windings energized from a source of power and positioned on said polar extensions, a slot in the extremity of each of said polar extensions nearest the rotor, an auxiliary winding including two portions thereof each having a higher resistance and a lower reactance than said main field windings positioned in said slots between diametrically opposed polar extensions, a first circuit means energizing said main field winding and only a portion of said auxiliary winding to provide a rotating flux field in one direction around said rotor, and second circuit means including said first circuit means energizing said main field winding and both portions of said auxiliary winding to provide a rotating flux field about said rotor in an opposite direction.

3. A reversible alternating current motor, comprising in combination, a rotor, a stator including a core portion and a plurality of pole pieces so positioned on said core portion as to provide an opening therebetween in which said rotor is positioned and is free to rotate, said pole pieces each having a slot in the extremity nearest the rotor, a tapped main field winding positioned on said pole pieces and connected to a source of power, a tapped auxiliary winding having two sections thereof each with a higher resistance and a lower reactance than said main field winding, said auxiliary winding being positioned between diametrically opposed pole pieces with portions of the same mounted in said slots, one of said sections of said auxiliary winding being permanently connected in series with a part of said main field winding across said source of power, and means selectively connecting said remaining section of said auxiliary winding in parallel with said main field winding across said source of power.

4. A reversible alternating current motor, comprising in combination, a rotor, a stator including a core portion and a plurality of pole pieces positioned on said core portion to provide an opening therebetween in which said rotor is positioned and is free to rotate, each of said pole pieces having a slot in the extremity nearest the rotor, a tapped main field winding positioned on said stator and connected to a source of power, a tapped auxiliary winding having two sections thereof positioned between pairs of said pole pieces with a portion of said winding being mounted in each of said slots, one of said sections of said auxiliary winding being permanently connected in series with a part of said main field winding across said source of power, and means selectively connecting said remaining section of said auxiliary winding in parallel with said main field winding across said source of power.

5. A reversible alternating current motor, comprising in combination, a rotor, a stator including a core portion and a pole piece portion, said pole piece portion having a cylindrical opening for providing a pair of pole faces, each face of which has a slot therein, said rotor being mounted for rotation within said opening, a tapped main field winding connected across a source of power and positioned on said stator, an auxiliary winding having a higher resistance and a lower reactance than said main field winding and being center tapped to provide two sections thereof, said auxiliary winding being positioned between said pole faces so that a portion of said winding is mounted in each of said slots in said pole faces with the unmounted portion thereof encircling the under side of said rotor shaft, one of said sections of said auxiliary winding being permanently connected in series with a part of said main field winding across said source of power, and means selectively connecting said remaining section of said auxiliary winding in parallel with said main field winding across said source of power, said stator having a flux produced therein from said auxiliary winding which is displaced in phase from that flux produced by the main field winding in one direction when one section thereof is energized and having flux produced therein from said auxiliary winding which is displaced in phase in an opposite direction from that flux produced by the main field winding when both sections of said auxiliary winding are energized.

6. A reversible alternating current motor, comprising in combination, a rotor having an axis, a stator having a pair of polar extensions so positioned to provide an opening in which said rotor is positioned and is free to rotate, said polar extensions having pole faces adjacent to said rotor and a slot in each of said pole faces parallel to the plane of said rotor axis, a tapped main field winding mounted on said stator and energized from a source of power to produce a main energizing flux, a tapped auxiliary field winding positioned between said pair of polar extensions and mounted in said slots, a section of said tapped auxiliary field winding being connected permanently in series with a section of said main field winding across said source of power, a second section of said auxiliary field winding being selectively connected in parallel with said main field winding across said source of power, said first section of said auxiliary winding when energized producing a flux which is displaced in phase from that flux produced by the main field winding to provide rotation of said rotor in one direction, and both of said sections of said winding when energized producing an effective flux displaced in phase in an opposite direction from that flux produced by the main field winding to provide rotation of said rotor in an opposite direction.

7. A reversible alternating current motor, comprising in combination, a squirrel cage rotor, a stator including a core portion and a pole piece portion, said pole piece portion having a cylindrical opening for providing a pair of pole faces which are bridged by the remaining material external of said opening in said piece portion, each pole face having a slot therein, said rotor being mounted for rotation within said opening, a pair of main field energizing windings connected in series and across a source of power, said main field windings being positioned on said pole pieces at the extremities nearest said core portion, an auxiliary winding having a higher resistance and a lower reactance than said main field windings and being center tapped to provide two sections thereof, said auxiliary winding being positioned between said pole pieces so that a portion of said winding is mounted in each of said slots with the unmounted portion thereof encircling the underside of said rotor, one extremity of said auxiliary winding being connected to the junction of said main field windings, said tap of said auxiliary winding being connected to one extremity of the main field windings in series, control means connecting the other extremity of said auxiliary winding to the opposite extremity of said main field windings in series, said stator having a flux produced therein by said auxiliary winding which is displaced in phase from that flux produced by the main field windings in one direction when one section of said auxiliary winding is energized and having flux produced therein by said auxiliary winding which is displaced in phase in an opposite direction from the flux produced by the main field windings when both sections of said auxiliary winding are energized.

8. An alternating current motor comprising relatively rotatable primary and secondary members, said primary member having a magnetic circuit embracing said secondary member, a tapped single phase primary winding for producing a main flux through said magnetic circuit and said secondary member, a tapped auxiliary winding for producing a flux through said secondary member in quadrature to that flux produced by said primary winding, a first portion of said auxiliary winding being permanently connected in series with a portion of said primary winding, and means for connecting a second portion of said auxiliary winding in parallel with said primary winding.

9. An alternating current motor comprising a primary stator member and a secondary rotor member, said primary member having a bipolar magnetic circuit embracing said secondary rotor member, a tapped single phase primary winding for producing a main flux through said magnetic circuit and said secondary rotor member, a tapped auxiliary winding mounted between said poles of said primary member for producing a flux in quadrature to that flux produced by said primary winding, a first portion of said auxiliary winding being permanently connected in series with a portion of said primary winding, and means for connecting a second portion of said auxiliary winding in parallel with said primary winding.

CARL G. KRONMILLER.

REFERENCES CITED

The following references are of record in the file of this patent:

UNITED STATES PATENTS

| Number | Name | Date |
| --- | --- | --- |
| 2,153,865 | Gersch | Apr. 11, 1939 |
| 2,123,140 | McCarthy | July 5, 1938 |